United States Patent
Douglas et al.

(10) Patent No.: US 12,238,100 B1
(45) Date of Patent: Feb. 25, 2025

(54) TERMINATION SWITCH FOR CONTROLLED-ENVIRONMENT FACILITY RESIDENT COMMUNICATION AND/OR MEDIA DEVICES

(71) Applicant: Securus Technologies, LLC, Carrollton, TX (US)

(72) Inventors: Christopher Douglas, McKinney, TX (US); Amit Kumar Shrivastava, Montréal (CA); Isaac Parampottil, Coppell, TX (US); Christopher Barrett Bruton, Frisco, TX (US)

(73) Assignee: Securus Technologies, LLC, Plano, TX (US)

( * ) Notice: Subject to any disclaimer, the term of this patent is extended or adjusted under 35 U.S.C. 154(b) by 1014 days.

(21) Appl. No.: 17/154,167

(22) Filed: Jan. 21, 2021

(51) Int. Cl.
*H04L 9/40* (2022.01)
*G06F 3/0483* (2013.01)

(52) U.S. Cl.
CPC ............ *H04L 63/10* (2013.01); *G06F 3/0483* (2013.01)

(58) Field of Classification Search
CPC ..... G06F 21/31; H04L 63/102; H04L 67/306; H04L 63/08; H04L 63/20; H04L 63/10
See application file for complete search history.

(56) References Cited

U.S. PATENT DOCUMENTS

| | | | |
|---|---|---|---|
| 11,743,246 B2 * | 8/2023 | Palmer | H04L 63/10 709/225 |
| 2014/0258155 A1* | 9/2014 | Suryanarayanan | H04L 67/1021 726/29 |
| 2015/0135257 A1* | 5/2015 | Shah | H04L 63/105 726/1 |
| 2017/0142115 A1* | 5/2017 | Chaddha | H04L 63/10 |

* cited by examiner

*Primary Examiner* — Jerry B Dennison
(74) *Attorney, Agent, or Firm* — Fogarty LLP (57) ABSTRACT

A controlled-environment facility resident communication and/or media device master control employs a controlled-environment facility vendor datacenter, a centralized investigative data aggregation and analysis system, or the like, to provide a controlled-environment facility management portal to a controlled-environment facility administrator, presenting an option to disable controlled-environment facility resident communication and/or media devices operating in a controlled-environment facility. The controlled-environment facility vendor datacenter, or the like, disables access to controlled-environment facility resident communication and/or media devices operating in the controlled-environment facility, in response to selection of the option to disable devices operating in the facility, sends a message to devices operating in the facility to disable all application programs on a respective device, and disable access to devices operating in the controlled-environment facility.

17 Claims, 3 Drawing Sheets

TERMINATION SWITCH FOR CONTROLLED-ENVIRONMENT FACILITY RESIDENT COMMUNICATION AND/OR MEDIA DEVICES

TECHNICAL FIELD

The present disclosure relates generally to controlled-environment facility resident communication and/or media devices, more particularly to administration of controlled-environment facility resident communication and/or media devices, and specifically to an administrative "termination switch" (emergency stop, emergency off, emergency power off, or the like) for controlled-environment facility resident communication and/or media devices that may be implemented by controlled-environment facility, and/or controlled-environment facility vendor, personnel.

BACKGROUND

According to the International Centre for Prison Studies, the United States has the highest prison population per capita in the world. In 2009, for example, 1 out of every 135 U.S. residents was incarcerated. Generally, incarcerated individuals convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an incarcerated individual may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of (monitored) visitation, including individual-to-individual videoconferences, which may be typically referred to as "video visitation," online chat sessions, email, text messages, etc. More recently, jails and prisons have begun to allow incarcerated individuals to use portable electronic devices, such as smartphones, media devices, tablet computing devices, or the like, to facilitate contact with friends and family and for entertainment and education.

However, over the past several years, the above-mentioned sharp increase in the U.S. incarcerated individual population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to sufficiently monitor use of portable electronic devices, perform investigations with respect to their own incarcerated individuals (with respect to such devices), or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a controlled-environment facility resident communication and/or media device master control which may employ a controlled-environment facility vendor datacenter, a centralized investigative data aggregation and analysis system, or the like, to provide a controlled-environment facility management portal to a controlled-environment facility administrator and present, in the controlled-environment facility management portal, an option to disable controlled-environment facility resident communication and/or media devices operating in a controlled-environment facility. The option to disable controlled-environment facility resident communication and/or media devices operating in the controlled-environment facility may be displayed on a controlled-environment facility resident communication and/or media device disabling page of the controlled-environment facility management portal. The controlled-environment facility management portal may be accessed via an application program (app) in some implementations. The controlled-environment facility vendor datacenter, the centralized investigative data aggregation and analysis system, and/or the like may enable login of the controlled-environment facility administrator into the controlled-environment facility management portal.

The controlled-environment facility vendor datacenter, or the like, may disable access to controlled-environment facility resident communication and/or media devices operating in the controlled-environment facility, in response to selection of the option to disable controlled-environment facility resident communication and/or media devices operating in the controlled-environment facility. The controlled-environment facility vendor datacenter, or the like, may also, in furtherance thereof, send a message to controlled-environment facility resident communication and/or media devices operating in the controlled-environment facility to disable all apps on a respective device and disable access to the controlled-environment facility resident communication and/or media devices operating in the controlled-environment facility.

Also, in furtherance thereof, the controlled-environment facility vendor datacenter, or the like, may disable future access to controlled-environment facility resident communication and/or media devices operating in the controlled-environment facility, in response to selection of the option to disable devices operating in the controlled-environment facility. Additionally, in furtherance thereof, the controlled-environment facility vendor datacenter, or the like, may lock apps on the respective controlled-environment facility resident communication and/or media device by disabling all apps available on a screen of the respective controlled-environment facility resident communication and/or media device.

The controlled-environment facility vendor datacenter, or the like, may include one or more datacenter controlled-environment facility resident communication and/or media device backend servers. The centralized investigative data aggregation and analysis system, the controlled-environment facility vendor datacenter, and/or the like may notify the controlled-environment facility resident communication and/or media device backend server(s) of restrictions to impose to effect disabling login to controlled-environment facility resident communication and/or media devices operating in the controlled-environment facility, in response to selection of the option to disable devices operating in the controlled-environment facility. The controlled-environment facility resident communication and/or media device backend server(s) may also disable future access to controlled-environment facility resident communication and/or media devices operating in the controlled-environment facility, in response to selection of the option to disable devices operating in the controlled-environment facility, send the message to devices operating in the controlled-environment facility to disable all apps on a respective device, disable users logged in on devices operating in the controlled-environment facility, and lock apps on the respective device by disabling all apps available on a screen of the respective device.

The controlled-environment facility vendor datacenter, the centralized investigative data aggregation and analysis system, or the like, may display an option, in the portal, to disable one or more apps operating on controlled-environment facility resident communication and/or media devices operating in the controlled-environment facility. The controlled-environment facility vendor datacenter, and/or the like, may, in response to selection to disable app(s) operating on controlled-environment facility resident communication and/or media devices operating in the controlled-environment facility, disable access to devices operating in the controlled-environment facility, send the message to devices operating in the controlled-environment facility to disable all apps on the respective device, and disable users on devices operating in the controlled-environment facility.

The option to disable controlled-environment facility resident communication and/or media devices operating in the controlled-environment facility presented by the portal may include options to: disable devices operating in the controlled-environment facilities of a customer of the controlled-environment facility vendor, disable devices operating in a particular controlled-environment facility, disable devices operating within a particular location within the controlled-environment facility, disable a particular device, disable functions of a particular app on devices operating in a controlled-environment facility, disable a device associated with a particular controlled-environment facility resident, and/or disable devices associated with a particular group of controlled-environment facility residents. The controlled-environment facility vendor datacenter, and/or the like may, in response to selection of an option to disable controlled-environment facility resident communication and/or media devices operating within a particular location within the controlled-environment facility, disable access to devices operating within the particular location within the controlled-environment facility, send the message to devices operating within the particular location within the controlled-environment facility to disable all apps on the respective, and disable access on devices operating within the particular location within the controlled-environment facility. In response to selection of the option to disable a particular controlled-environment facility resident communication and/or media device operating in the controlled-environment facility, the controlled-environment facility vendor datacenter, and/or the like may, disable access to the particular device, send the message to the particular device to disable all apps on the particular device, and disable access on the particular device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as incarcerated individuals, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to controlled-environment facility resident communication and/or media devices, more particularly to administration of such controlled-environment facility resident communication and/or media devices, and specifically to an administrative "termination switch" (emergency stop, emergency off, emergency power off, or the like) that may be implemented by controlled-environment facility, and/or controlled-environment facility vendor, personnel, for such controlled-environment facility resident communication and/or media devices. In accordance with embodiments of the present systems and methods, controlled-environment facility resident communication and/or media device master control may employ a controlled-environment facility vendor datacenter, a centralized investigative data aggregation and analysis system, or the like, to provide a controlled-environment facility management portal to a controlled-environment facility administrator, presenting an option to disable controlled-environment facility resident communication and/or media devices operating in a controlled-environment facility. The controlled-environment facility vendor datacenter, or the like, disables access to controlled-environment facility resident communication and/or media devices operating in the controlled-environment facility, in response to selection of the option to disable devices operating in the facility, sends a message to devices operating in the facility to disable all application programs (apps) on a respective device, and disable access to devices operating in the controlled-environment facility. This disablement of controlled-environment facility resident communication and/or media devices, apps, functions, or the like, as well as corresponding "re-enablement," can be scheduled, including on a reoccurring basis (e.g., on a daily basis to enforce a "lights-out" time, or the like).

Figure 1:
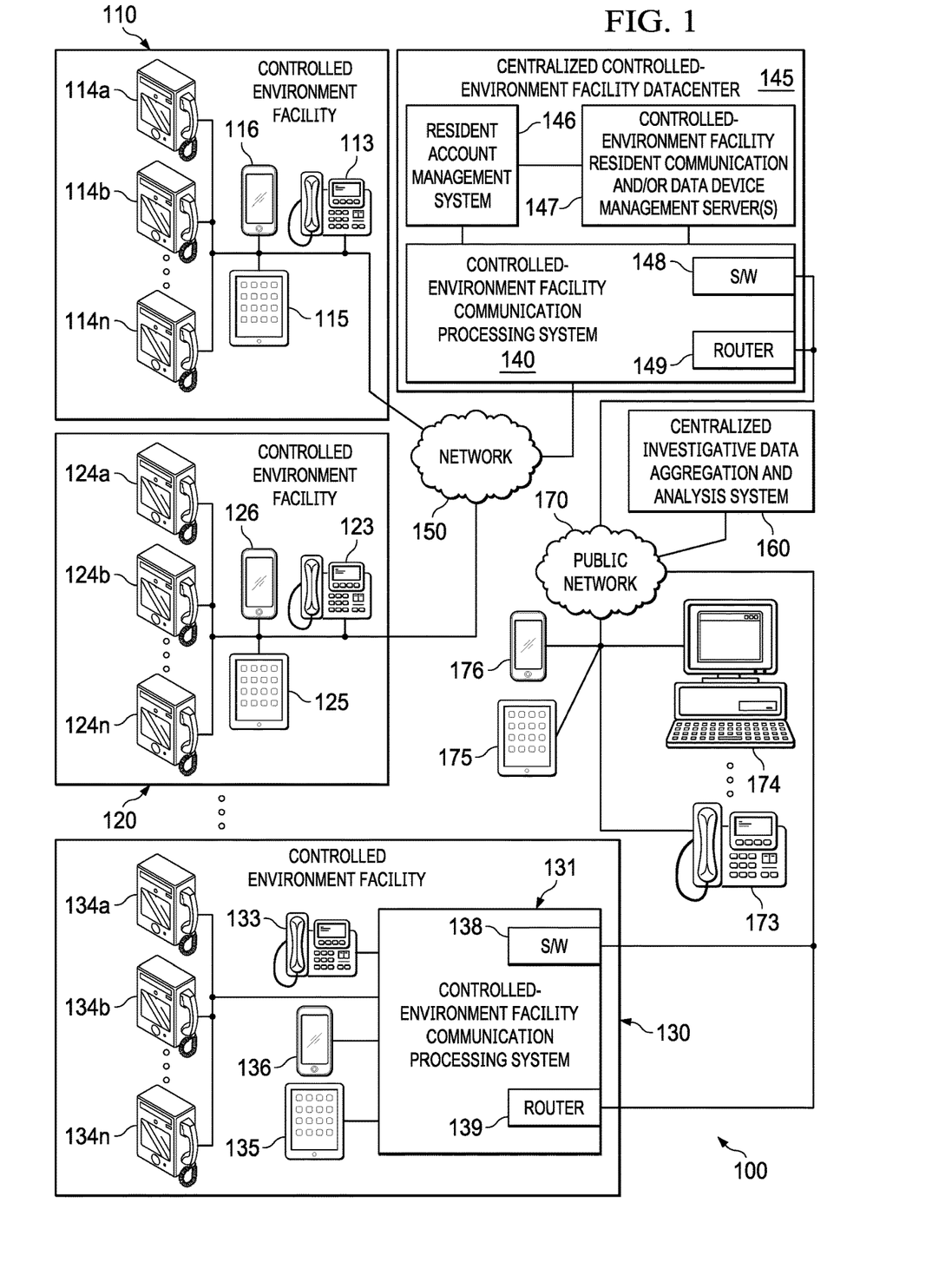
FIG. 1 is a diagrammatic illustration of an example environment, wherein an example embodiment of the present systems and methods for implementation of an administrative termination switch for controlled-environment facility resident communication and/or media devices may be deployed in conjunction with multiple, or a single, controlled-environment facility, according to some embodiments.

FIG. 1 is a diagrammatic illustration of example environment 100, wherein an example embodiment of the present systems and methods for implementation of an administrative termination switch for controlled-environment facility resident communication and/or media devices 114, 115, 116, 124, 125, 126, 134, 135, 136, etc. may be deployed in conjunction with multiple, or a single, controlled-environment facilities 110, 120, 130 etc., in accordance with some embodiments. Therein, external, centralized communication processing system 140, onsite communication processing system 131, or the like may provide telephone services, videoconferencing, online chat, and other communication services to residents of respective controlled-environment facility 110, 120, 130, etc. As illustrated, in some cases, a communication processing system (131) may be co-located with a controlled-environment facility (130). Alternatively, as also illustrated a communication processing system (140) may be centrally or remotely located, in whole or in part, with respect to one or more controlled-environment facilities (110, 120, etc.), such as in a controlled-environment facility vendor datacenter (145), and may be connected to such facilities via a public or private network (150) (e.g., via a secure tunneling protocol over the internet, using encapsulation, an intranet, or other type of data network), and may provide communication services to such multiple controlled-environment facilities. More generally, however, it should be noted that communication systems 131, 140, etc. may assume a variety of forms, including telephony switches such as electronic switching systems, or the like, and/or and may be configured to serve a variety of facilities and/or users, whether within or outside of a controlled-environment facility.

In addition to providing certain visitation and communication operations, communication processing systems 131 and 140 may attempt to ensure that an incarcerated individual's electronic communications, such as calls, video conferences, online chats, etc. are performed only with non-residents whose identities, devices, email addresses, phone numbers, etc. are listed in that incarcerated individual's Personal Allowed Number (PAN) or Pre-Approved Contact (PAC) list. Each incarcerated individual's PAN or PAC list may be stored, for example, in a database maintained by controlled-environment facility vendor datacenter 145, centralized investigative data aggregation and analysis system 160, and/or the like. In addition to PAC and/or PAN list(s), controlled-environment facility vendor datacenter 145, centralized investigative data aggregation and analysis system 160, and/or the like, may also store Resident Profile Data (RPD), as well as communication and/or visitation rules applicable to each resident, Communication Detail Records (CDRs), or similar records, for resident electronic communications, such as phone calls, video visitations, texts, online chats, or the like. This controlled-environment facility vendor datacenter 145 and/or centralized investigative data aggregation and analysis system 160 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 146, which may be a separate system, or which may be a part or function of controlled-environment facility vendor datacenter 145, as illustrated, may maintain resident accounts to the benefit of the respective resident, such as resident commissary accounts, resident communications accounts, which may be used to pay for purchase of a controlled-environment facility resident communication and/or media devices (115, 116, 125, 126, 135, 136, etc.), communications, such as phone calls, video visitation, internet chats, emails, text messages, online chats, e-messaging, or the like.

Thereby, in some embodiments, the lives of incarcerated individuals/residents may be electronically managed from booking through release, through facility management (including tracking incarcerated individuals from booking through release), staff management (including time and attendance management and personnel dispatching), call management (including placing and blocking electronic communications, accounting for call charges, distance commerce, determining credit worthiness of individuals, establishing and maintaining accounts, and handling purchases of goods and services), and incarcerated individual management (including managing incarcerated individual information and tracking incarcerated individual activity). Other management systems may include public phone companies, cell phone forensics, internet service providers, visitation systems including video and non-video systems, postal services, email services, payment processors and the like.

Residents may use more-or-less conventional telephones 113, 123, 133, or the like to access certain communication services, under control of respective communication processing system 121, 131, 141, etc. Additionally, or alternatively, in some facilities a resident may use an intelligent controlled-environment facility communication and/or media terminal 114a through 114n, 124a through 124n, 134a through 134n, or the like, to place voice calls, as well as for video visitation, under control of respective communication processing system 121, 131, 141, etc. Such an intelligent controlled-environment facility communication and/or media terminal device may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc.

Additionally, or alternatively, in some facilities, residents may use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent personal controlled-environment facility resident communication and/or media device, Intelligent Resident Device (IRD), or the like, and in a correctional institution embodiment, as an intelligent incarcerated individual personal communication and/or media device, Intelligent Incarcerated individual Device (IID), or the like.

As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc. Herein, IFDs 114a through 114n, 124a through 124n, 134a through 134n, TRDs 115, 116, 125, 126, 135, 136, or other similar devices, may be referred to collectively or individually as "(a) controlled-environment facility resident communication and/or media device(s)," or the like.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. Further, in accordance with embodiments of the present systems and methods, the intelligent facility device may provide controlled-environment facility residents limited and/or monitored internet access. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs may be tablet computing devices 115, 125, 135, etc., or smartphone/media players 116, 126, 136, etc., adapted and/or approved for use by residents of the respective controlled-environment facility (within the controlled-environment facility) 110, 120, 130, etc. Each TRD may be particularly adapted for use in a controlled-environment. For example, such an IRD may be "stripped-down," particularly from the standpoint of what apps are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on an IRD might include apps of particular interest to residents of the controlled-environment facility. For example, an IRD provided to incarcerated individuals of correctional facilities, might include apps that may be of particular use to an incarcerated individual, in general, such as access to a legal research service, or of more specific interest, such as providing an incarcerated individual nearing release, access to employment searching apps or the like. Hence, such IRDs may be used to help soon to be released incarcerated individuals' transition. For example, the IRD may be used to communicate with a future employer, or the like. As such, IRDs may be sponsored, or otherwise subsidized by organizations or companies, assisting with the transition of incarcerated individuals into society. As noted, in accordance with embodiments of the present systems and methods, IRDs may be used to communicate with others, such as through phone calls, video calls, or the like. Further, in accordance with embodiments of the present systems and methods the IRDs may provide controlled-environment facility residents limited and/or monitored internet access. In accordance with embodiments of the present systems and methods, IRDs 115, 116, 125, 126, 135, 136, etc. may be employed to facilitate implementation of embodiments of the present systems and methods, and/or to carry out all or certain aspects of embodiments of the present systems and methods.

For a resident to initiate an outgoing communication, the resident may initiate telephone services by lifting the receiver on telephone 113, 123,133, etc. or IFD 114, 124, 134, etc. and/or otherwise initiating a call, such as by launching an app on TRD 115, 125, 135, 116, 126, 136, etc. At which time, the resident may be prompted to provide a PIN, other identifying information or biometrics. Interactive voice response (IVR) unit 127, 137 or 147, which may be integrated into communication processing system 121, 131 and/or 141, as illustrated, may generate and play a prompt or other messages to the resident. Under the control of communication processing system 121, 131 and/or 141, etc. the device may be capable of connecting with a non-resident's device (e.g., telephone 173, non-resident computer 174, non-resident tablet computing device 175, non-resident smartphone/media player 176, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, such as network 150. Telephony switches 128, 138, 148 etc. in respective communication processing system 121, 131, 141, etc. may be used to connect calls across a PSTN (i.e., network 170), such as calls from controlled-environment facility telephone 113, 123 or 133 and non-resident telephone 173, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e., network 170). For example, a non-resident party may have a personal or laptop computer 174 with a webcam, or the like, or devices 175 or 176 may have an integrated camera and display (e.g., a smart phone, tablet, etc.). A network connection between the parties may be established and supported by an organization or commercial service that provides computer services and software for use in telecommunications and/or VoIP, such as SKYPE©. Additionally, or alternatively, the correctional facility and/or the destination may use videoconferencing equipment compatible with ITU H.323, H.320, H.264, and/or V.80, or other suitable standards.

In some implementations, communication processing system systems 140 and/or 131, may be configured to perform communication monitoring operations, such as being configured to monitor and/or record communication sessions (e.g., as electronic video files). Embodiments of the present systems and methods may also employ a secure, web-based portal enabling individuals to store and transmit information, including forensic tools that analyze communications into and out of controlled-environment facilities, that assists law enforcement. Such a portal may be provided by centralized investigative data aggregation and analysis system 160, which may be made up of one or more servers, or the like, providing such investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), electronic communication notification, electronic communication monitoring (whether real-time or recorded, and whether monitoring a particular electronic communication or a plurality of electronic communications), call "barging," electronic communication control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web page (e.g. the aforementioned "portal") having menus comprising an investigator dashboard may be provided, to present and facilitate execution of various investigative operations. These investigative tools may log calls (e.g., as CDRs), so that an investigator may research them through an archive and may be provided access to internal and/or external criminal databases and/or other sources of useful information.

In accordance with embodiments of the present systems and methods, controlled-environment facility vendor datacenter 145, controlled-environment facility centralized investigative data aggregation and analysis system 160, and/or the like, may provide a controlled-environment facility management portal to a controlled-environment facility administrator (including, in some embodiments, controlled-environment facility vendor personnel, or the like). Access to this portal, and/or to the options discussed herein, may be provided via an app, or the like. Controlled-environment facility vendor datacenter 145, controlled-environment facility centralized investigative data aggregation and analysis system 160, and/or the like, may enable the controlled-environment facility administrator to login into the controlled-environment facility management portal. For example, the controlled-environment facility vendor datacenter, controlled-environment facility centralized investigative data aggregation and analysis system, and/or the like, may request and accept identification information, from the controlled-environment facility administrator, and verify the identification information. The controlled-environment facility management portal, in accordance with embodiments of the present systems and methods, presents an option to disable controlled-environment facility resident communication and/or media devices operating in (e.g., associated with, disposed in, registered with) the administrator's controlled-environment facility. The controlled-environment facility management portal may be a controlled-environment facility resident communication and/or media device management portal, and/or the option to disable resident devices operating in the controlled-environment facility may be displayed on a controlled-environment facility resident communication and/or media device disabling page of a controlled-environment facility management portal. For example, the controlled-environment facility management portal (home or front (web) page) may present an option to enter a controlled-environment facility resident communication and/or media device management portal, or the like. This resident device management portal may be presented in response to selection of the option to enter the resident device management portal. Then, on the resident device management portal the option to disable resident devices operating in the administrator's controlled-environment facility may be presented to the administrator.

The central controlled-environment facility vendor datacenter, and/or the like, may, in some embodiments, in response to selection of the option to disable controlled-environment facility resident communication and/or media devices operating in the controlled-environment facility by the administrator, ask the administrator to confirm their selection, and/or may require the administrator to go through an approval process to turn off devices, such as an email or other notification to a supervisor that can approve the request to disable/enable devices.

Also, in accordance with embodiments of the present systems and methods, controlled-environment facility vendor datacenter 145, and/or the like, may include controlled-environment facility resident communication and/or media device management (backend) sever(s) 147, in addition to communication processing system(s) 140, servers providing controlled-environment facility resident management system 146, and/or the like. The central controlled-environment facility vendor datacenter, and/or the like, may, in response to selection of the option to disable controlled-environment facility resident communication and/or media devices operating in the controlled-environment facility by the administrator, disable access to resident devices operating in the controlled-environment facility, through operation of such resident device management (backend) sever(s) 147. That is, centralized investigative data aggregation and analysis system 160, or other elements of the controlled-environment facility vendor datacenter, and/or the like, may notify the resident device backend servers about the selection to disable the devices and the restrictions to be imposed to effect disabling of login to resident devices operating in the controlled-environment facility.

Further, in response to selection of the option to disable controlled-environment facility resident communication and/or media devices, central controlled-environment facility vendor datacenter 145, and/or the like, (e.g., controlled-environment facility resident communication and/or media device (backend) server(s) 147) may send a message to controlled-environment facility resident communication and/or media devices operating in the controlled-environment facility to disable all apps on the respective receiving resident device and disable access to resident devices operating in the controlled-environment facility. To such ends, after disabling access, any future attempts to authenticate on disabled devise will be rejected by corresponding backend server(s). That is, future access to resident devices operating in the controlled-environment facility may also be disabled, in response to selection of the option to disable devices operating in the controlled-environment facility. Further, central controlled-environment facility vendor datacenter 145, and/or the like, (e.g., resident device (backend) server(s) 147) may also lock (the) application(s) on the resident device(s) by disabling all applications available on the device screen(s).

Additionally, or alternatively, more than one option to disable controlled-environment facility resident communication and/or media devices operating in the controlled-environment facility may be presented. For example, one such option may be to disable controlled-environment facility resident communication and/or media devices operating in the controlled-environment facilities of a customer of the controlled-environment facility vendor, such as more than one controlled-environment facility under control of the administrator, at least for the purposes of managing resident devices. Another such option may be to disable controlled-environment facility resident communication and/or media devices operating in a particular controlled-environment facility, such as one of a number of facilities under the control of the administrator, at least for the purposes of managing resident devices. A further option may be to disable controlled-environment facility resident communication and/or media devices operating within a particular location within the controlled-environment facility. An additional option may be to disable one, or a group of particular controlled-environment facility resident communication and/or media device(s) operating in the controlled-environment facility. Another option may be to disable functions of a particular app on controlled-environment facility resident communication and/or media devices operating in a (particular) controlled-environment facility. A still further option may be to disable a controlled-environment facility resident communication and/or media device associated with a particular controlled-environment facility resident. Yet another option may be to disable controlled-environment facility resident communication and/or media devices associated with a particular group of controlled-environment facility residents, such as residents associated with a particular gang, in a particular housing unit (cellblock, pod, or the like), etc.

In such embodiments, when an option to disable controlled-environment facility resident communication and/or media devices operating within a particular location within the controlled-environment facility is selected, logins to the devices operating within the particular location within the controlled-environment facility are disabled, the aforementioned message to disable all apps on the respective device is sent to the devices operating within the particular location within the controlled-environment facility, and users logged in on devices operating within the particular location within the controlled-environment facility are logged out. Alternatively, in such embodiments, in response to selection of the option to disable a particular controlled-environment facility resident communication and/or media device operating in the controlled-environment facility login to the particular device is disabled, the apps on the particular device are disabled, and any user logged in on the particular device is logged out.

In further, or alternative, embodiments, controlled-environment facility vendor datacenter 145, the centralized investigative data aggregation and analysis system 160, and/or the like, may display, on the controlled-environment facility management portal, controlled-environment facility resident communication and/or media device management portal, disabling page, etc., an option to disable one or more apps operating on controlled-environment facility resident communication and/or media devices operating in a controlled-environment facility. In such embodiments, the controlled-environment facility vendor datacenter, or the like, (e.g., controlled-environment facility resident communication and/or media device (backend) server(s) 147) may, such as in the manner discussed above, disable access to resident devices operating in the controlled-environment facility, send a message to resident devices operating in the controlled-environment facility to disable all apps on the respective resident device, disable access to resident devices operating in the controlled-environment facility, and lock (the) application(s) by disabling all applications available on the device screen(s), in response to selection to disable one or more apps operating on resident devices operating in the controlled-environment facility.

The administrative portal or app may enable the administrator, or other controlled-environment facility and/or controlled-environment facility vendor personnel, to "turn on" (i.e., re-enable) the disabled controlled-environment facility resident communication and/or media devices, apps, functions, or the like. This enablement, as well as the disablement discussed above, may be scheduled, including scheduled, on the portal and/or on the app, on a reoccurring basis (e.g., on a daily basis to enforce a "lights-out" time, or the like).

Computer-based environment components may include programming and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Figure 2:
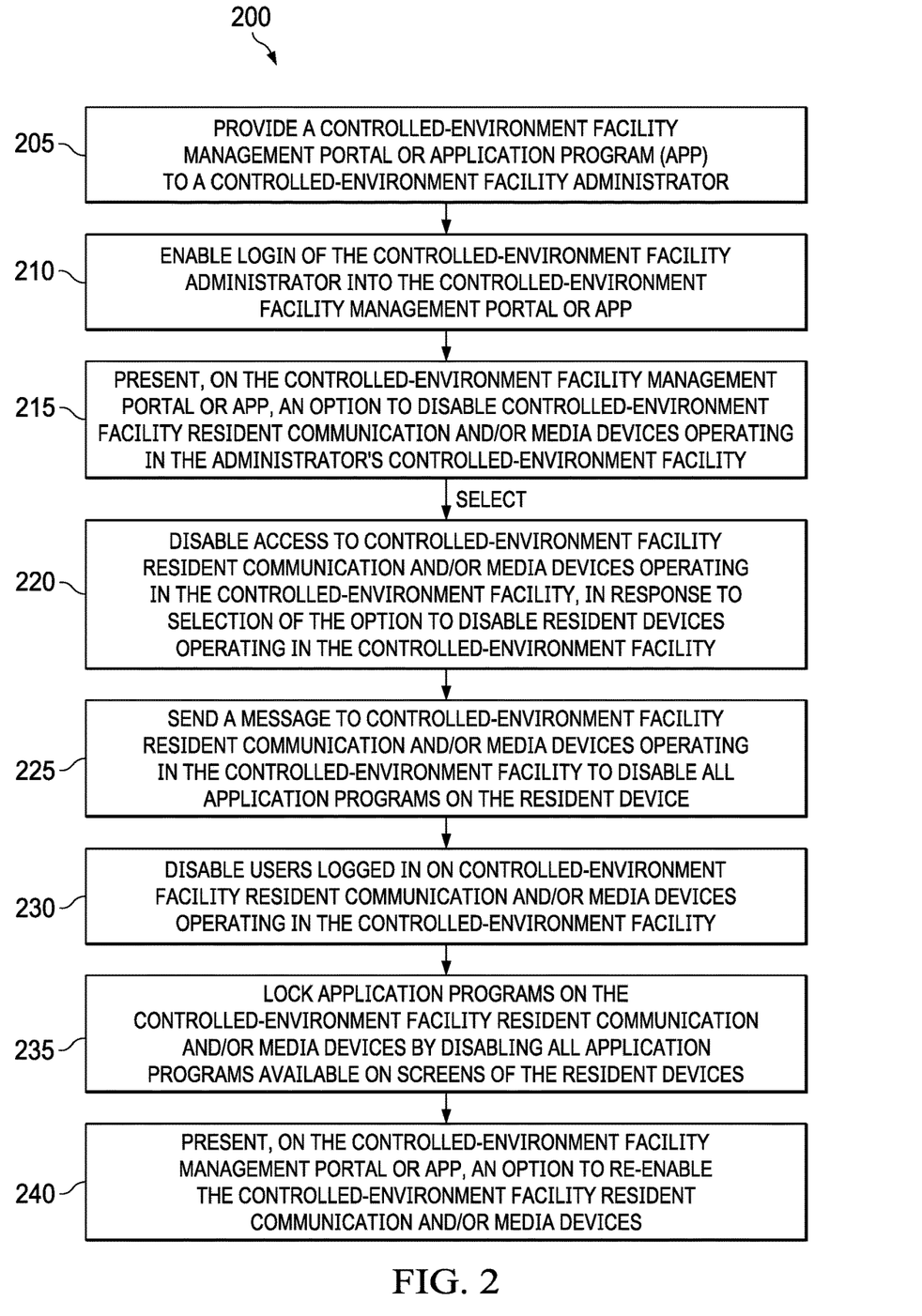
FIG. 2 is a flowchart of an example implementation of providing a controlled-environment facility administrator a termination switch to disable controlled-environment facility resident communication and/or media devices, according to some embodiments.

FIG. 2 is a flowchart of example implementation 200 for providing a controlled-environment facility administrator a termination switch to disable controlled-environment facility resident communication and/or media devices (114, 115, 116, 124, 125, 126, 134, 135 and/or 136), according to some embodiments. Therein, at 205 a controlled-environment facility vendor datacenter (e.g., controlled-environment facility resident communication and/or media device management (backend) servers 147 of controlled-environment facility vendor datacenter 145), a controlled-environment facility centralized investigative data aggregation and analysis system (160), and/or the like, may provide a controlled-environment facility management portal for use by a controlled-environment facility administrator, or the like (including, in some embodiments, controlled-environment facility vendor personnel, or the like). Access to this portal, and/or to the options discussed herein, may be provided via an app, or the like.

At 210, a controlled-environment facility administrator is enabled to login into the controlled-environment facility management portal or app, through operation of the controlled-environment facility vendor datacenter (145), the centralized investigative data aggregation and analysis system (160), and/or the like. For example, the controlled-environment facility vendor datacenter, controlled-environment facility centralized investigative data aggregation and analysis system, and/or the like, may request and accept identification information, from the controlled-environment facility administrator, and verify the identification information at 210. At 215, the controlled-environment facility management portal or app presents an option to disable controlled-environment facility resident communication and/or media devices operating in (e.g., associated with, disposed in, registered with) the administrator's controlled-environment facility (110, 120, 130, etc.), in accordance with embodiments of the present systems and methods.

The controlled-environment facility management portal may be, or may operate as a controlled-environment facility resident communication and/or media device management portal. In various embodiments the option to disable controlled-environment facility resident communication and/or media devices operating in the controlled-environment facility presented at 215 may be displayed on a controlled-environment facility resident communication and/or media device disabling/enabling page of the controlled-environment facility management portal. For example, following login at 210, the controlled-environment facility management portal (home or front (web) page) may present an option to enter a controlled-environment facility resident communication and/or media device management portal, webpage, app, or the like. This resident device management portal may be presented in response to selection of the option to enter the resident device management portal, or in response to selection of an (other) option on the controlled-environment facility management portal home page or in the app, at 215 to disable/enable controlled-environment facility resident communication and/or media devices operating in (e.g., associated with, disposed in, registered with) the administrator's controlled-environment facility. Then, on the resident device management portal or page, one or more options to disable/enable resident devices operating in the administrator's controlled-environment facility may be presented to the administrator in furtherance of 215 above.

In additional, or alternative, embodiments, more than one option to disable or enable controlled-environment facility resident communication and/or media devices (114, 115, 116, 124, 125, 126, 134, 135 and/or 136) operating in the controlled-environment facility may be presented at 215. For example, one such option may be to disable resident devices operating in the controlled-environment facilities of a customer of the controlled-environment facility vendor, such as resident devices, in one or more controlled-environment facilities, under control of the administrator. Another such option may be to disable resident devices operating in a particular controlled-environment facility, such as resident devices, in one of a number of facilities, under the control of the administrator. A further option may be to disable resident devices operating within a particular location within a (particular) controlled-environment facility. An additional option may be to disable one, or a group of particular resident device(s) operating in the controlled-environment facility. A different option may be to disable controlled-environment facility resident communication and/or media device based on type of device (for example leave all tablet and/or smartphone devices (115 and 116) running but disable all communal devices (114), or vice versa. Another option may be to disable functions of a particular app on controlled-environment facility resident communication and/or media devices operating in a (particular) controlled-environment facility. A still further option may be to disable a controlled-environment facility resident communication and/or media device associated with a particular controlled-environment facility resident. Yet another option may be to disable controlled-environment facility resident communication and/or media devices associated with a particular group of controlled-environment facility residents, such as residents associated with a particular gang, in a particular housing unit (cellblock, pod, or the like), etc.

In further, or alternative, embodiments, the controlled-environment facility vendor datacenter (145), the centralized investigative data aggregation and analysis system (160), and/or the like, may display, at 215, on the controlled-environment facility management portal or app, controlled-environment facility resident communication and/or media device management portal, disabling/enabling page, etc., an option to disable one or more apps operating on controlled-environment facility resident communication and/or media devices operating in one or more controlled-environment facilities.

The central controlled-environment facility vendor datacenter (145), and/or the like, may, in some embodiments, in response to selection of the option to disable controlled-environment facility resident communication and/or media devices operating in the controlled-environment facility by the administrator, ask the administrator to confirm their selection, and/or may require the administrator to go through an approval process to turn off devices, such as an email or other notification to a supervisor that can approve the request to disable/enable devices.

At 220, upon selection of (one of) the option(s) presented at 215 to disable controlled-environment facility resident communication and/or media devices (114, 115, 116, 124, 125, 126, 134, 135 and/or 136) operating in the administrator's controlled-environment facility (110, 120, 130, etc.), the controlled-environment facility vendor datacenter (145), and/or the like may disable access to such resident devices operating in that controlled-environment facility. As noted, this may be carried out through operation of controlled-environment facility vendor datacenter (backend) servers that provide a controlled-environment facility resident management system (147), and the like. In operation, at 220, the centralized investigative data aggregation and analysis system (160), or other elements of the controlled-environment facility vendor datacenter, may notify the controlled-environment facility resident communication and/or media device backend servers about the selection at 215 to disable the devices and the restrictions to be imposed to effect disabling of login to resident devices operating in the affected controlled-environment facility or facilities. After disabling access, any future attempts to authenticate on disabled devise will be rejected by corresponding backend server(s). That is, future access to resident devices operating in the controlled-environment facility may also be disabled, in response to selection of the option to disable devices operating in the controlled-environment facility.

Also, at the time of disablement of the controlled-environment facility resident communication and/or media devices, apps, functions, or the like at 220, the administrator, or other controlled-environment facility and/or controlled-environment facility vendor personnel, may schedule "re-enablement" to "turn on" the disabled controlled-environment facility resident communication and/or media devices, apps, functions, or the like. Also, disablement at 220 may be scheduled, including scheduled on a reoccurring basis (e.g., daily at a particular "lights out" time, or the like).

Further, in response to selection of the option to disable resident devices presented at 215 (and/or following the disablement at 220), the central controlled-environment facility vendor datacenter (145) ((backend) controlled-environment facility resident management system servers (147)), or the like, may, at 225, send a message to controlled-environment facility resident communication and/or media devices operating in the affected controlled-environment facility (110, 120, 130, etc.), to disable all apps on the respective receiving resident device, disable access to the respective device, at 230, and, at 235, lock (the) application(s) by disabling all applications available on the device screen.

In embodiments where an option to disable controlled-environment facility resident communication and/or media devices (114, 115, 116, 124, 125, 126, 134, 135 and/or 136) operating within a particular location within a (particular) controlled-environment facility (110, 120, 130, and/or the like), presented at 215 is selected, logins to the devices operating within the particular location within the controlled-environment facility are disabled at 220, the aforementioned message to disable all apps on the respective device is sent to the devices operating within the particular location within the controlled-environment facility at 225, at 230 users logged in on devices operating within the particular location within the controlled-environment facility are logged out and at 235 all applications available on the affected device screens are disabled to lock (the) application(s).

Alternatively, in embodiments where an option to disable a particular controlled-environment facility resident communication and/or media device (114, 115, 116, 124, 125, 126, 134, 135 or 136) operating in the (particular) controlled-environment facility (110, 120, 130, or the like) presented at 215 is selected, the controlled-environment facility vendor datacenter (145, resident device management server(s) 147, and/or the like) may disable access to the particular device at 220, at 225 the message to disable all apps on the particular device is sent to that particular device, any user logged in on the particular device is logged out at 230, and at 235 all applications available on the particular device's screen are disabled to lock (the) application(s).

In embodiments where an option to disable one or more apps operating on controlled-environment facility resident communication and/or media devices (114, 115, 116, 124, 125, 126, 134, 135 and/or 136) operating in a controlled-environment facility (110, 120, 130, etc.) is offered at 215 and selected, the controlled-environment facility vendor datacenter (145, resident device management server(s) 147, and/or the like) may, at 220 disable access to controlled-environment facility resident communication and/or media devices operating in the controlled-environment facility, send a message at 225 to resident devices operating in the controlled-environment facility to disable all apps on the respective resident device, at 230 disable access to resident devices operating in the controlled-environment facility, and lock the application by disabling all applications available on the device screen(s) at 235.

At 240, the administrator, or other controlled-environment facility and/or controlled-environment facility vendor personnel, may be enabled to "turn on" (i.e., re-enable) the disabled controlled-environment facility resident communication and/or media devices, apps, functions, or the like. This enablement may, like disablement at 220, be scheduled, including scheduled on a reoccurring basis (e.g., daily at a particular "wake-up" time, or the like), selected at the time of disablement at 220, or the like.

Various elements of the present controlled-environment facility resident contact tools for intelligent controlled-environment facility resident communication and/or media device interfaces may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Figure 3:
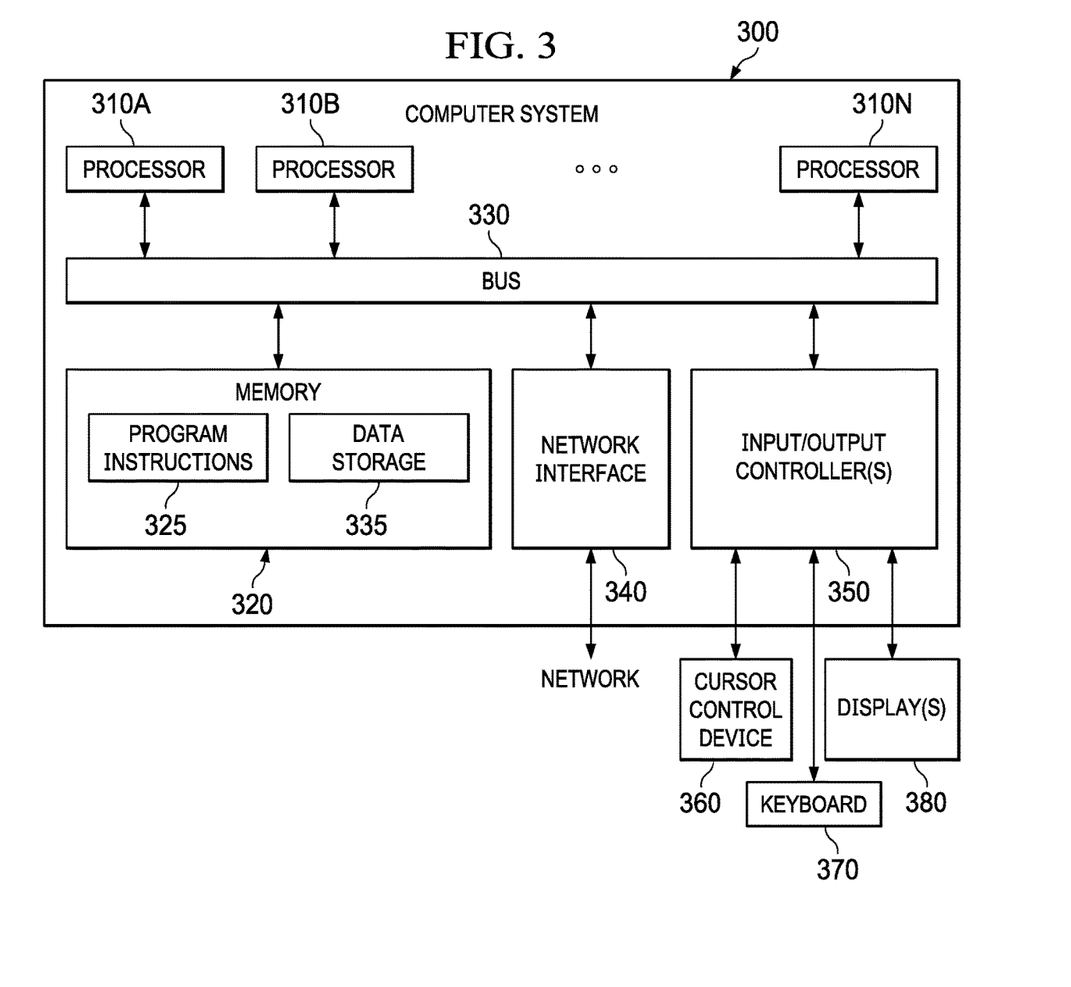
FIG. 3 is a block diagram of a computer system, device, station, or terminal configured to implement various techniques disclosed herein, according to some embodiments.

Embodiments of the present systems and methods for providing an administrative "termination switch" (emergency stop, emergency off, emergency power off, or the like) for controlled-environment facility resident communication and/or media devices that may be implemented by controlled-environment facility personnel, controlled-environment facility vendor personnel, or the like as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIGS. 1 and 2, and/or a computer system such as computer system 300 may be used as part of, one or more of: controlled environment facility communications management systems 131 and/or 140; controlled-environment facility vendor datacenter 145, controlled-environment facility resident communication and/or media device management (backend) sever(s) 147, centralized investigative data aggregation and analysis system 160; controlled-environment facility resident communications devices 113 through 116, 123 through 126, and 133 through 136; non-resident communications devices 173 through 176; and/or the like. In various embodiments two or more of these computer systems may be configured to communicate with each other in any suitable way, such as, for example, via a network. For example, in FIG. 1, centralized investigative data aggregation and analysis system 160 is illustrated as communicating with controlled-environment facility communications management systems 131 and 140, via public network 170, which may be the Internet. Further, users of the present investigative data aggregation and analysis system may communicate therewith via public network 170 (e.g. the Internet) or the like.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310).

In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 and 2. Program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIG. 1 though 3, may be implemented in software executed by processing circuitry, hardware, or a combination thereof. As noted, programming may take the form of stored program instructions, programed firmware, or the like, while hardware might take the form of an ASIC, or the like, to carry out such aspects of embodiments of the present systems and methods. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident communication and/or media device master control system comprising:
   a controlled-environment facility vendor datacenter and/or a centralized investigative data aggregation and analysis system configured to:
      provide a controlled-environment facility management portal to a controlled-environment facility administrator; and
      present, in the controlled-environment facility management portal, an option to disable controlled-environment facility resident communication and/or media devices operating in a controlled-environment facility;
   disable access to the controlled-environment facility resident communication and/or media devices operating in the controlled-environment facility, in response to selection of the option to disable the controlled-environment facility resident communication and/or media devices operating in the controlled-environment facility;
   send a message to the controlled-environment facility resident communication and/or media devices operating in the controlled-environment facility to disable one or more application programs executed by a respective controlled-environment facility resident communication and/or media device; and
   notify one or more controlled-environment facility resident communication and/or media device backend servers of restrictions to effect disabling login to the controlled-environment facility resident communication and/or media devices operating in the controlled-environment facility, in response to selection of the option to disable the controlled-environment facility resident communication and/or media devices operating in the controlled-environment facility.

2. The system of claim 1, wherein the controlled-environment facility vendor datacenter is further configured to also disable future access to the controlled-environment facility resident communication and/or media devices operating in the controlled-environment facility, in response to selection of the option to disable the controlled-environment facility resident communication and/or media devices operating in the controlled-environment facility.

3. The system of claim 1, wherein the controlled-environment facility vendor datacenter is further configured to lock the application programs on the respective controlled-environment facility resident communication and/or media device by disabling all of the application programs available on a screen of the respective controlled-environment facility resident communication and/or media device.

4. The system of claim 1, wherein the one or more controlled-environment facility resident communication and/or media device backend servers are further configured to:
    disable future access to controlled-environment facility resident communication and/or media devices operating in the controlled-environment facility, in response to selection of the option to disable controlled-environment facility resident communication and/or media devices operating in the controlled-environment facility;
    send the message to controlled-environment facility resident communication and/or media devices operating in the controlled-environment facility to disable all of the application programs on a respective controlled-environment facility resident communication and/or media device;
    disable users logged in on controlled-environment facility resident communication and/or media devices operating in the controlled-environment facility; and
    lock the application programs on the respective controlled-environment facility resident communication and/or media device by disabling all of the application programs available on a screen of the respective controlled-environment facility resident communication and/or media device.

5. The system of claim 1 wherein:
    the controlled-environment facility vendor datacenter and/or the centralized investigative data aggregation and analysis system is further configured to display an option to disable the one or more application programs operating on the controlled-environment facility resident communication and/or media devices operating in the controlled-environment facility; and
    the controlled-environment facility vendor datacenter is further configured to disable access to controlled-environment facility resident communication and/or media devices operating in the controlled-environment facility, send the message to controlled-environment facility resident communication and/or media devices operating in the controlled-environment facility to disable all of the application programs on the respective controlled-environment facility resident communication and/or media device, and disable users on the controlled-environment facility resident communication and/or media devices operating in the controlled-environment facility, in response to selection to disable one or more of the application programs operating on controlled-environment facility resident communication and/or media devices operating in the controlled-environment facility.

6. The system of claim 1, wherein the controlled-environment facility vendor datacenter and/or the centralized investigative data aggregation and analysis system is further configured to enable login of the controlled-environment facility administrator into the controlled-environment facility management portal.

7. The system of claim 1, wherein the controlled-environment facility management portal is accessed via another application program.

8. The system of claim 1, wherein the option to disable the controlled-environment facility resident communication and/or media devices operating in the controlled-environment facility is displayed on a controlled-environment facility resident communication and/or media device disabling page of the controlled-environment facility management portal.

9. A method for providing a controlled-environment facility administrator a master control over controlled-environment facility resident communication and/or media devices, the method comprising:
    providing, by a controlled-environment facility vendor datacenter and/or a centralized investigative data aggregation and analysis system, a controlled-environment facility management portal to a controlled-environment facility administrator;
    presenting, by the controlled-environment facility vendor datacenter and/or the centralized investigative data aggregation and analysis system, on the controlled-environment facility management portal, an option to disable the controlled-environment facility resident communication and/or media devices operating in the controlled-environment facility;
    receiving selection of the option to disable the controlled-environment facility resident communication and/or media devices operating in the controlled-environment facility;
    disabling, by the controlled-environment facility vendor datacenter, access to the controlled-environment facility resident communication and/or media devices operating in the controlled-environment facility, in response to selection of the option to disable the controlled-environment facility resident communication and/or media devices operating in the controlled-environment facility; and
    sending, by the controlled-environment facility vendor datacenter, a message to the controlled-environment facility resident communication and/or media devices operating in the controlled-environment facility to disable one or more application programs executed by the respective controlled-environment facility resident communication and/or media device;
    notifying, by the centralized investigative data aggregation and analysis system and/or the controlled-environment facility vendor datacenter, one or more controlled-environment facility resident communication and/or media device backend servers of restrictions to effect disabling login to the controlled-environment facility resident communication and/or media devices operating in the controlled-environment facility, in response to selection of the option to disable the controlled-environment facility resident communication and/or media devices operating in the controlled-environment facility.

10. The method of claim 9, further comprising disabling future access to the controlled-environment facility resident communication and/or media devices operating in the controlled-environment facility, in response to selection of the option to disable the controlled-environment facility resident communication and/or media devices operating in the controlled-environment facility.

11. The method of claim 9, further comprising locking the application programs on the respective controlled-environment facility resident communication and/or media device by disabling all of the application programs available on a screen of the respective controlled-environment facility resident communication and/or media device.

12. The method of claim 9, further comprising:
disabling, by the one or more controlled-environment facility resident communication and/or media device backend servers, future access to controlled-environment facility resident communication and/or media devices operating in the controlled-environment facility, in response to selection of the option to disable the controlled-environment facility resident communication and/or media devices operating in the controlled-environment facility;
the one or more controlled-environment facility resident communication and/or media device backend servers sending the message to the controlled-environment facility resident communication and/or media devices operating in the controlled-environment facility to disable all of the application programs on a respective controlled-environment facility resident communication and/or media device;
the one or more controlled-environment facility resident communication and/or media device backend servers logging out the users logged in on controlled-environment facility resident communication and/or media devices operating in the controlled-environment facility; and
locking the application programs on the respective controlled-environment facility resident communication and/or media device, by the one or more controlled-environment facility resident communication and/or media device backend servers disabling all of the application programs available on a screen of the respective controlled-environment facility resident communication and/or media device.

13. The method of claim 9, wherein:
presenting an option to disable the controlled-environment facility resident communication and/or media devices operating in the controlled-environment facility further comprises displaying an option to disable one or more of the application programs operating on controlled-environment facility resident communication and/or media devices operating in the controlled-environment facility; and
disabling login to the controlled-environment facility resident communication and/or media devices operating in the controlled-environment facility, sending the message to the controlled-environment facility resident communication and/or media devices operating in the controlled-environment facility to disable all of the application programs on the respective controlled-environment facility resident communication and/or media device, and disabling access on the controlled-environment facility resident communication and/or media devices operating in the controlled-environment facility is carried out in response to selection to disable one or more of the application programs operating on the controlled-environment facility resident communication and/or media devices operating in the controlled-environment facility.

14. The method of claim 9, wherein disabling access to the controlled-environment facility resident communication and/or media devices operating in the controlled-environment facility further comprises disabling future access to the controlled-environment facility resident communication and/or media devices operating in the controlled-environment facility.

15. The method of claim 9, further comprising enabling access of the controlled-environment facility administrator into the controlled-environment facility management portal.

16. The method of claim 9, wherein the controlled-environment facility management portal is a controlled-environment facility resident communication and/or media device management portal accessed via another application program.

17. The method of claim 9, further comprising:
presenting an option on the controlled-environment facility management portal to enter a controlled-environment facility resident communication and/or media device management portal;
presenting the controlled-environment facility resident communication and/or media device management portal in response to selection of the option to enter the controlled-environment facility resident communication and/or media device management portal; and
presenting on the controlled-environment facility resident communication and/or media device management portal the option to disable the controlled-environment facility resident communication and/or media devices operating in the controlled-environment facility.

\* \* \* \* \*